2,694,699

Patented Nov. 16, 1954

2,694,699

ALPHA-SULFONOXY ACRYLATES AND POLYMERS THEREOF

Thomas T. M. Laakso and Delbert D. Reynolds, Rochester, N. Y., assignors to Eastman Kodak Company, Rochester, N. Y., a corporation of New Jersey No Drawing. Application February 15, 1952, Serial No. 271,858

7 Claims. (Cl. 260—79.3)

This invention relates to alpha-sulfonoxy acrylic esters, to polymers therefrom, and to processes for their preparation.

The ethyl ester of $\beta$-chlorolactic acid was described by C. F. Koelsch in the Journal of the American Chemical Society, volume 52, pages 1105–1106 (1930). By substituting various other alcohols in the process described by Koelsch, other esters of $\beta$-chlorolactic acid can be prepared. Such esters have heretofore been employed as intermediates for the preparation of alpha-substituted acrylic esters wherein the alpha substituent is the acyl or acid radical of a carboxylic acid.

We have now found that various esters of $\beta$-halolactic acid can be reacted with alkyl or aryl sulfonyl chlorides to give alpha-sulfonoxy-$\beta$-halopropionic esters which can then be dehydrohalogenated with organic tertiary amines to give the corresponding and new alpha-sulfonoxy acrylic esters. The new compounds are homopolymerizable and readily copolymerizable with other ethenoid monomers to give useful, high molecular weight resinous materials. Such polymers can be used as intermediates for the preparation of other resinous materials, for example, nitrogenous resins because of the relatively easy replacement of the sulfonoxy group by amino groups.

It is, accordingly, an object of the invention to provide a new class of acrylic esters characterized by having an active alpha-sulfonoxy group constituent. Another object is to provide polymeric resins of the same. Another is to provide a process for preparing the monomers and polymers of the invention. Other objects will become apparent hereinafter.

In accordance with the invention, we prepare the intermediate alpha-sulfonoxy-$\beta$-halopropionic esters of the invention by reacting an alkyl-$\beta$-halolactate with at least a molar equivalent of an alkyl or aryl or aralkyl sulfonyl chloride under anhydrous conditions, for example, in an inert liquid medium such as anhydrous benzene, in the presence of a tertiary amine such as pyridine or 2,6-lutidine, at a temperature of from 0°–30° C., preferably at room temperatures, and separating the alpha-sulfonoxy-$\beta$-halopropionate, which forms, from the reaction mixture by conventional methods such as crystallization, distillation, etc. depending on the physical state and specific characteristics of the final product. The intermediate alpha-sulfonoxy-$\beta$-halopropionic esters are represented by the following general formula:

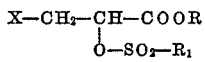

wherein R and $R_1$ each represents a hydrocarbon radical such as an alkyl group containing from 1 to 4 carbon atoms (e. g. methyl, ethyl, propyl, isopropyl, butyl, isobutyl, etc. groups), and an aryl group such as phenyl, tolyl, xylyl or naphthyl groups, and X represents a halogen atom such as chlorine or bromine. The particular intermediate prepared as above described is then dehydrohalogenated by reacting it with at least an equal molar quantity of a tertiary amine which does not tend to quaternize easily, under anhydrous conditions, preferably in an inert liquid medium such as anhydrous benzene, toluene, xylene, etc., at a temperature of from about 50° to 140° C., until the dehydrohalogenating reaction is substantially complete, and then separating the formed alpha-sulfonoxy acrylates from the reaction mixture. The new products of the invention prepared by the process above described have the following general formula:

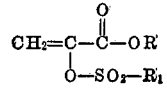

wherein R and $R_1$ have the previously defined values.

The $\beta$-halolactates which can be employed in the process of our invention include methyl-$\beta$-chlorolactate, ethyl-$\beta$-chlorolactate, n-propyl-$\beta$-chlorolactate, isopropyl-$\beta$-chlorolactate, n-butyl-$\beta$-chlorolactate, isobutyl-$\beta$-chlorolactate, phenyl-$\beta$-chlorolactate, p-tolyl-$\beta$-chlorolactate, naphthyl-$\beta$-chlorolactate, methyl-$\beta$-bromolactate, ethyl-$\beta$-bromolactate, n-butyl-$\beta$-bromolactate, phenyl-$\beta$-bromolactate, etc.

The sulfonating agents which can be employed in the process of our invention for preparing the intermediate alpha-sulfonoxy-$\beta$-halopropionic esters include alkane sulfonyl chlorides (e. g. methane sulfonyl chloride, ethane sulfonyl chloride, propane sulfonyl chloride, butane sulfonyl chloride, etc.) and aromatic sulfonyl chlorides (e. g. benzene sulfonyl chloride, p-toluene sulfonyl chloride, alpha-naphthalene sulfonyl chloride, $\beta$-naphthalene sulfonyl chloride and the like). The amount of sulfonating agent can be varied advantageously from just enough of the agent to react with all the hydroxyls of the $\beta$-halolactates, and with any water which may be present, to an amount considerably in excess of that required for the reaction, but preferably for efficient operation from 1 to 3 gram-moles of the sulfonating agent to each gram-mole of the $\beta$-halolactate which is present.

Suitable tertiary amines for the dehydrohalogenation step include aliphatic amines such as trimethylamine, triethylamine, tri-n-propylamine, tri-n-butylamine, etc., the aromatic amines such as N,N-dimethylaniline, N,N-diethylaniline, etc., and the heterocyclic amines such as quinoline, 2,6-lutidine, etc. The amount of the tertiary amine employed can be varied from just enough to dehydrohalogenate all of the intermediate alpha-sulfonoxy-$\beta$-halopropionic ester to a considerable excess of that required for the reaction, but preferably from about 1 to 3 gram-moles of the tertiary amine to each gram-mole of the ester which is present.

The polymerization of the new monomers of the invention alone or conjointly with one or more other polymerizable compounds to high molecular weight resinous polymers is accelerated by heat, by actinic light and by polymerization catalysts which are known to promote the polymerization reactions such as peroxides including benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali metal perborates, the water-soluble salts of percarbonic acid, the water-soluble salts of perphosphoric acid, etc. The organic peroxides are especially suitable. Mixtures of one or more of the catalysts can be employed. The amount of catalyst employed can vary from about 0.02 to 3.0 per cent, based on the total weight of monomers. An activating agent such as sodium bisulfite can be used, if desired, in conjunction with the polymerization catalysts. Chain regulators such as alkyl mercaptans (e. g. hexyl, octyl, lauryl, dodecyl mercaptans, etc.) can also be added with advantage to the polymerization mixtures.

The polymerizations can be carried out in mass or dispersed in a nonsolvent for the monomers, the particles of dispersed monomer being very small (emulsion) or relatively large (bead or granular). For emulsion polymerization, any nonsolvent for the monomers can be employed, water being especially suitable. The mixture containing the monomers can advantageously be dispersed or emulsified in water using dispersing or emulsifying agents in a relatively small amount not exceeding 3 percent of the weight of monomers such as salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.), salts of aromatic sulfonic acids (e. g. sodium or potassium salts of alkylnaphthalene sulfonic acids, etc.), higher molecular weight quaternary ammonium salts (e. g. dimethylbenzylphenyl ammonium chloride, quaternary salts containing the radicals $C_{15}H_{31}$ and $C_{17}H_{35}$, etc.) or dispersing agents such as starch, methylated starch, gum arabic, finely divided magnesium carbonate, and the like. Mixtures of dispersing or emulsifying agents can be used. Stirring, shaking or tumbling of the polymerization mixture during the polymerization gives improved product and yield.

The new monomers of the invention readily copolymerize with one or more other polymerizable unsaturated compounds containing a single ethylenic unsaturation, i. e. containing the basic group $CH_2=C<$, to give high molecular weight resinous polymers, for example, one or more of any of the new monomers with one or more unsaturated compounds from the group including vinyl esters of carboxylic acids (e. g. vinyl acetate, vinyl propionate, vinyl butyrate, vinyl stearate, vinyl trifluoroacetate, vinyl benzoate, etc.), vinyl alkyl ketones (e. g. methyl vinyl ketone, ethyl vinyl ketone, etc.), vinyl alkyl ethers (e. g. methyl vinyl ether, butyl vinyl ether, etc.), vinyl sulfonamides (e. g. vinyl sulfonamide, N-methyl vinyl sulfonamide, etc.), vinyl halides (e. g. vinyl chloride, vinyl bromide and vinyl fluoride), vinylidene halides (e. g. vinylidene dichloride, vinylidene dibromide, vinylidene chloride-bromide, etc.), vinyl alkyl sulfones (e. g. vinyl methyl sulfone, vinyl ethyl sulfone, etc.), vinyl urethanes (e. g. vinyl methyl urethane, vinyl ethyl urethane, etc.), cyclic vinyl imides (e. g. vinyl succinimide, vinyl phthalimide, etc.), acrylic acid and its anhydride, amide, N-alkyl amides, nitrile and methyl, ethyl, butyl, benzyl, phenyl, etc. esters, and the corresponding methacrylic acid derivatives. The proportions of components in the copolymers can vary from about 45 to 70 parts by weight of the alpha-sulfonoxy acrylate monomers and from about 55 to 30 parts by weight of the other unsaturated monomers. In general, the starting polymerization mixtures contain a somewhat larger proportion by weight of the alpha-sulfonoxy acrylate component than do the resulting copolymers.

The following examples will serve to illustrate further our new alpha-sulfonoxy acrylates, polymers thereof, and the manner of preparing the same.

*Example 1*

188 g. (1.23 m.) of ethyl-β-chlorolactate and 140 g. (1.23 m.) of methane sulfonyl chloride were dissolved in 1000 cc. of anhydrous benzene. To this solution, cooled to room temperature, was added 98.4 g. (1.23 m.) of anhydrous pyridine. The reaction mixture was allowed to stand at room temperature for three days. The precipitated crystalline material was removed by filtration and the filtrate was washed with three portions of cold water. These water washings were followed by one washing with 5 per cent cold aqueous sulfuric acid and then with successive washings with cold water until the filtrate was neutral to litmus paper. A washing with cold 5 per cent aqueous solution of sodium bicarbonate was followed by a final wash with water. After drying over anhydrous magnesium sulfate, the reaction product was fractionally distilled from a modified Claisen flask. A yield of 164 grams or 58 per cent of the theoretical was obtained of the product, ethyl-α-methanesulfonoxy-β-chloropropionate, in the form of a water-white, viscous oil, B. P. 118°–119° C./0.5 mm.

*Analysis.*—Calculated for $C_6H_{11}O_5SCl$:

|  | Percent Calculated | Percent Found |
| --- | --- | --- |
| Carbon | 31.4 | 31.6 |
| Hydrogen | 4.7 | 4.7 |
| Sulphur | 13.9 | 13.8 |
| Chlorine | 15.4 | 15.7 |

380 g. (1.31 m.) of ethyl-α-methanesulfonoxy-β-chloropropionate prepared by the process described above, 280 g. (2.62 m.) of 2,6-lutidine and 1000 cc. of anhydrous benzene were refluxed for two days under anhydrous conditions. After cooling, the precipitated crystals were filtered out and the filtrate washed with three successive portions of cold water. The water washes were followed by a cold 5 per cent aqueous sulfuric acid wash, then by successive washings with water until the filtrate became neutral to litmus. A washing with cold 5 per cent aqueous sodium bicarbonate was followed by washing with water. The washed liquid was then fractionally distilled from a modified Claisen flask. A yield of 124 g. or 49 per cent of theoretical was obtained of a light yellow, viscous oil, B. P. 102°–103° C./0.5 mm., which analyzed:

|  | Calculated for $C_6H_{10}O_5S$ | Found |
| --- | --- | --- |
| Carbon percent by wgt | 37.1 | 37.1 |
| Hydrogen do | 5.1 | 5.1 |
| Sulfur do | 16.5 | 16.3 |

The analysis indicated that the product was substantially pure ethyl α-methanesulfonoxy acrylate having the formula:

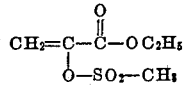

In place of the ethyl α-methanesulfonoxy-β-chloropropionate in the above example, there can be substituted an equivalent amount of methyl, n-propyl or n-butyl α-methanesulfonoxy-β-chloropropionates to give the corresponding methyl α-methanesulfonoxy acrylate, n-propyl α-methanesulfonoxy acrylate and n-butyl α-methanesulfonoxy acrylate.

*Example 2*

176.6 g. (1 m.) of benzene sulfonyl chloride and 152.5 g. (1 m.) of ethyl-β-chlorolactate were dissolved in 1500 cc. of anhydrous benzene. To this solution cooled to room temperature, there were added 80 g. (1 m.) of anhydrous pyridine. The reaction mixture was allowed to stand at room temperature for 24 hours, after which it was washed with three successive portions of cold water. The water washings were followed by one washing with cold aqueous 5 per cent sulfuric acid and then with successive washings with cold water, until the reaction mixture was neutral to litmus paper. A further washing of the mixture with cold 5 per cent aqueous sodium bicarbonate solution was followed by a final wash with water. After drying over anhydrous magnesium sulfate, the reaction product was fractionally distilled from a modified Claisen flask to give 125 g. or 43.2 per cent of calculated theory of a light yellow, viscous oil, B. P. 161°–163° C./0.5 mm., which proved by analysis to be substantially pure ethyl α-benzenesulfonoxy-β-chloropropionate.

A mixture of 125 g. (0.43 m.) of ethyl α-benzenesulfonoxy-β-chloropropionate prepared as above, 50 g. (0.45 m.) of 2,6-lutidine and 250 cc. of anhydrous benzene was refluxed for a period of 24 hours under anhydrous conditions. After cooling, the reaction mixture was washed with three successive portions of cold water. The water washes where followed by a cold 5 per cent aqueous sulfuric acid wash, then successive washings with water until the solution was neutral to litmus paper. A washing with 5 per cent aqueous sodium bicarbonate solution was followed by washing with water. The washed product was then fractionally distilled from a modified Claisen flask. A yield of 25 g. or 22.7 per cent of theoretical was obtained of a lemon yellow, viscous oil, B. P. 148°–151° C./0.5 mm. which analyzed on a weight basis to contain 51.5 per cent carbon, 4.6 per cent hydrogen and 12.4 per cent sulfur compared with a calculated theoretical value of 51.5 per cent for carbon, 4.6 per cent for hydrogen and 12.5 per cent for sulfur, indicating thereby that the product obtained was substantially pure ethyl-α-benzenesulfonoxy acrylate having the general structural formula:

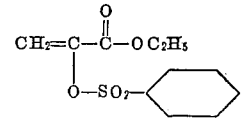

In place of the ethyl α-benzenesulfonoxy-β-chloropropionate in the above example, there can be substituted an equivalent amount of methyl, n-propyl or n-butyl α-benzenesulfonoxy-β-chloropropionate to give the corresponding methyl α-benzenesulfonoxy acrylate, n-propyl α-benzenesulfonoxy acrylate and n-butyl α-benzenesulfonoxy acrylate.

Example 3

190 g. (1 m.) of p-toluenesulfonyl chloride and 152.5 g. (1 m.) of ethyl-β-chlorolactate were dissolved in 500 cc. of anhydrous benzene. To this solution cooled to room temperature, there were added 80 g. (1 m.) of anhydrous pyridine. The reaction mixture was allowed to stand at room temperature for 24 hours, after which it was washed with three successive portions of cold water. The water washings were followed by one washing with cold 5 per cent aqueous sulfuric acid and then with successive washings with cold water until the residual liquid was neutral to litmus paper. The residual liquid was then washed with cold 5 per cent aqueous sodium bicarbonate solution, followed by a final wash with water. After drying the residual liquid over anhydrous magnesium sulfate, it was fractionally distilled from a modified Claisen flask. A yield of 125 g. or 41 per cent of theoretical was obtained of a light yellow, viscous oil, B. P. 170°–171° C./0.5 mm. which proved by analysis to be substantially pure ethyl-α-p-toluenesulfonoxy-β-chloropropionate.

123 g. (0.4 m.) of ethyl-α-p-toluenesulfonoxy-β-chloropropionate prepared as above described, 50 g. (0.4 m.) of 2,6-lutidine and 250 cc. of anhydrous benzene were refluxed together for 24 hours under anhydrous conditions. After cooling, the reaction mixture was washed with three successive changes of cold water, followed by a cold 5 per cent aqueous sulfuric acid wash and then by successive washings with water until the residual mixture was neutral to litmus paper. The mixture was then washed with 5 per cent aqueous sodium bicarbonate solution and finally washed with water. The residual reaction mixture was fractionally distilled from a modified Claisen flask. A yield of 40 g. or 37 per cent of theoretical was obtained of a yellow-orange colored oil, B. P. 175°–180° C./0.5 mm., which crystallized on standing as white crystals from ethyl ether, M. P. 43°–45° C. Analysis of the crystals gave on a weight basis 53.8 per cent carbon, 5.0 per cent hydrogen and 12.1 per cent sulfur compared with the calculated theoretical values of 53.2, 5.5 and 11.7 per cent for the above elements, respectively, indicating thereby that the product obtained was substantially pure ethyl-α-p-toluenesulfonoxy acrylate having the general structural formula:

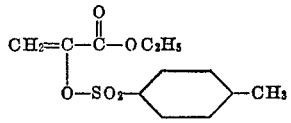

In place of the ethyl α-p-toluenesulfonoxy-β-chloropropionate in the above example, there can be substituted an equivalent amount of the methyl, propyl or butyl α-p-toluenesulfonoxy-β-chloropropionates to give the corresponding methyl α-p-toluenesulfonoxy acrylate, propyl α-p-toluenesulfonoxy acrylate and butyl α-p-toluenesulfonoxy acrylate. The corresponding α-o-toluenesulfonoxy acrylates and α-m-toluenesulfonoxy acrylates can be prepared in similar manner.

Example 4

10 g. of ethyl α-methanesulfonoxy acrylate were heated with 0.1 per cent by weight of benzoyl peroxide in a sealed tube, under nitrogen, for 48 hours at a temperature of 50° C. A very viscous, amber-colored, acetone-soluble homopolymeric resin of relatively high molecular weight was obtained.

In place of the ethyl α-methanesulfonoxy acrylate, there was substituted a similar amount of other monomeric acrylates of the invention such as methyl, propyl, butyl, benzyl, etc., α-methanesulfonoxy acrylates, methyl, ethyl, propyl, butyl, benzyl, etc., α-ethane sulfonoxy acrylates, methyl, ethyl, propyl, butyl, benzyl, etc., α-propanesulfonoxy acrylates and corresponding α-butanesulfonoxy acrylates, α-benzenesulfonoxy acrylates, α-toluenesulfonoxy acrylates, α-xylenesulfonoxy acrylates, and the like, obtaining thereby generally similar acetone-soluble, high molecular weight resinous products.

Example 5

10 g. of ethyl α-methanesulfonoxy acrylate were heated with 0.1 per cent by weight of azo-bis-isobutyrylnitrile, under nitrogen, for a period of 48 hours at 50° C. The resinous product obtained was generally similar to that of the homopolymer described in Example 4.

Example 6

10 g. of ethyl α-methanesulfonoxy acrylate were sealed under nitrogen in a glass tube and then exposed to ultraviolet radiation at about 72° C. for a period of 48 hours. A light yellow, very viscous, acetone-soluble homopolymer of high molecular weight was obtained.

Example 7

5 g. of ethyl α-benzenesulfonoxy acrylate and 1.9 g. of methyl methacrylate were copolymerized, in a sealed tube at 50° C. for 4 days under a nitrogen atmosphere, in the presence of 0.1 per cent of benzoyl peroxide. The polymer obtained was purified by dissolving in acetone and precipitating in distilled water, followed by redissolving in acetone and reprecipitating in ethyl alcohol. The white, friable polymer obtained analyzed by weight 54.9 per cent of carbon, 6.3 per cent of hydrogen and 6.6 per cent of sulfur, which values correspond to a copolymer containing approximately 27 mol. per cent or 49 per cent by weight of ethyl α-benzenesulfonoxy acrylate, the remainder of the resin molecule being methyl methacrylate.

In place of the methyl methacrylate in the above example, there can be substituted a similar amount of acrylonitrile to give a copolymer having related properties and containing from 45 to 70 parts by weight of ethyl α-benzenesulfonoxy acrylate and from 55 to 30 parts by weight of acrylonitrile.

Example 8

A mixture of 4.85 g. of ethyl α-methanesulfonoxy acrylate, 2.6 g. of styrene and 0.1 per cent by weight of the monomers of benzoyl peroxide was heated at 50° C. for a period of 4 days. At the end of this time, the copolymer which formed was purified by dissolving it in acetone and precipitating in distilled water. The process of dissolving and precipitating was repeated. The light yellow resin obtained was found to contain by weight 58.1 per cent of carbon, 6.2 per cent of hydrogen and 8.9 per cent of sulphur which values correspond to a copolymer containing approximately 37 mol per cent or 53 per cent by weight of ethyl α-methanesulfonoxy acrylate, the remainder of the resin molecule being styrene.

In place of the styrene in the above example, there can be submitted an equivalent amount of acrylonitrile to give a copolymer having related properties and containing from 45 to 70 parts by weight of ethyl α-methanesulfonoxy acrylate and from 55 to 30 parts by weight of acrylonitrile.

Example 9

A mixture of 4.85 g. of ethyl α-methanesulfonoxy acrylate, 2.15 g. of methyl acrylate and 0.1 per cent by weight of the monomers of benzoyl peroxide was heated at 50° C. for a period of 4 days, under a nitrogen atmosphere in a sealed tube. The polymer obtained was purified by dissolving it in acetone and precipitating in distilled water. This process was repeated. The light yellow polymer was dried over phosphorus pentoxide at reduced pressure. Analysis showed that the polymer contained by weight 46.5 per cent of carbon, 5.9 per cent of hydrogen and 8.0 per cent of sulfur which values correspond to a copolymer containing approximately 35 mol per cent or 55 per cent by weight of ethyl α-methanesulfonoxy acrylate, the remainder of the resin molecule being methyl acrylate.

Other polymers having generally similar properties can be readily prepared by the procedures set forth in the preceding examples. For example, by simply altering the proportions of the components in the polymerization mixtures, copolymers can be prepared which contain any percentage of one or more of the α-sulfonoxy acrylates of the invention within the specified range of from 45 to 70 per cent weight. In addition to the other mentioned uses, the polymers of the invention are all readily soluble in volatile solvents such as acetone and, accordingly, can be coated into films, etc. from such solutions, with or without plasticizers, or such solutions can be used as impregnating and sizing compositions. Fillers, pigments, etc. can be incorporated into such solutions, if desired.

What we claim is:

1. An alpha-sulfonoxy acrylate having the general formula:

$$CH_2=C-\overset{O}{\overset{\|}{C}}-OR$$
$$\phantom{CH_2=C}|$$
$$\phantom{CH_2=C}O-SO_2-R_1$$

wherein R and $R_1$ each represents a member selected from the group consisting of an alkyl group containing from 1 to 4 carbon atoms, a phenyl group, a tolyl group, a xylyl group and a naphthyl group.

2. Ethyl alpha-methanesulfonoxy acrylate.
3. Ethyl alpha-benzenesulfonoxy acrylate.
4. Ethyl alpha-p-toluenesulfonoxy acrylate.
5. n-Butyl alpha-methanesulfonoxy acrylate.
6. n-Butyl alpha-benzenesulfonoxy acrylate.

7. A resinous polymer of an alpha-sulfonoxy acrylate having the general formula:

$$CH_2=C-\overset{O}{\overset{\|}{C}}-OR$$
$$\phantom{CH_2=C}|$$
$$\phantom{CH_2=C}O-SO_2-R_1$$

wherein R and $R_1$ each represents a member selected from the group consisting of an alkyl group containing from 1 to 4 carbon atoms, a phenyl group, a tolyl group, a xylyl group and a naphthyl group.

References Cited in the file of this patent

UNITED STATES PATENTS

| Number | Name | Date |
|---|---|---|
| 2,527,300 | Dudley | Oct. 24, 1950 |